July 18, 1944.　　　F. J. LINDIG, JR　　　2,353,836
SOIL SHREDDER AND PULVERIZER
Filed March 18, 1941

Inventor
FRANK. J. LINDIG, JR.

By Howard L. Fischer
Attorney

Patented July 18, 1944

2,353,836

UNITED STATES PATENT OFFICE 2,353,836

SOIL SHREDDER AND PULVERIZER

Frank J. Lindig, Jr., St. Paul, Minn.

Application March 18, 1941, Serial No. 383,963

1 Claim. (Cl. 83—11)

This invention relates to a soil shredder and pulverizer adapted to be power operated to disintegrate soil as it passes through a machine, so that the fine material will be ready for seeding or potting by florists.

A feature of this invention resides in a portable disintegrater or soil pulverizer and mixer which can be moved from place to place and which operates to disintegrate or tear apart the soil or ground which is fed into the same, separating the stones, roots and the like, from the fine soil. Further, the machine may be used as a mixer to mix soil with fertilizer, or, various kinds of soil may be mixed together by passing the same through this soil pulverizer, making it easy for the operator to mix top dressings for putting greens, as well as preparing soil for florists, nurserymen, landscape architects, cemeteries, parks, or for private use where it is desired to treat the soil before it is used by thoroughly shredding the same.

A feature resides in providing a light-weight yet strong and durable soil shredder or mixer, operated by an electric motor or other suitable driving means, to rotate the skeleton drum which carries a series of tines which are mounted on a series of cross bars extending between a pair of parallel spider frames which are adapted to be rotated by the operating shaft. The tines are removably secured and the cross bars act as brace members between the parallelly disposed spider frames which form the sides of the drumlike rotator which carries the tines around in the machine to engage the soil as it is loaded into the machine and cause the soil to be shredded between the tines of the fixed cross bars extending between the sides of the machine and which supports a series of tines which depend in a manner to intersect between the tines on the cross bars of the rotating drum. The fixed cross bar which supports the depending tines in the machine is pivotally supported in a manner so that the same will release upon engaging stones or other objects which cannot be shredded between the intersecting tines of the drum and the pivoted or fixed tines.

It is a further feature to provide a cushioning means for the releasable tine bar which absorbs the shock of the supporting bar when it is forced up into releasing position and is caused to move back into depending operating position, thereby preventing undue wear on these operating parts. Springs hold the releasable tines in normal operating position depending from a position radially above the rotating drum.

A still further feature of this soil shredder and mixer resides in providing a rectangularly formed casing which extends about the top of the operating drum and which provides side walls which enclose the same with the major portion below the drum being open to the ground. A soil receiving hopper is provided formed extending above the frame or casing and is provided with an inclined wall which directs the soil slightly above the axis of the rotating drum and toward the fixed depending tines of the inner releasable cross bar. This causes the soil to be brought directly into position to be quickly shredded and mixed.

Another feature of this invention is to provide an angular L-shaped frame for supporting one end of the soil shredder from which extend handle portions, while the other end of the frame supports a pair of wheels so that when the handle portions are engaged and that end elevated, the wheels permit the soil shredder to be moved from place to place, making it readily portable, yet when the handles are released, the depending portions of the frame engage the ground to act as stops for holding the soil shredder firmly in place on the ground against moving while it is being operated. The casing is provided with adjustable soil deflecting end plate means at the open end thereof, while at the other end within the casing is provided a pocket in which the tines of the rotatable drum rotate and in which the soil is worked to thoroughly mix the same and carry it up and past the fixed tines in the top of the frame of the casing of the machine.

These features, together with other details and objects of the invention will be more fully and clearly set forth throughout the specification and claim.

In the drawing forming a part of this specification:

Figures 1, 2, 3, 4, 5, 6:
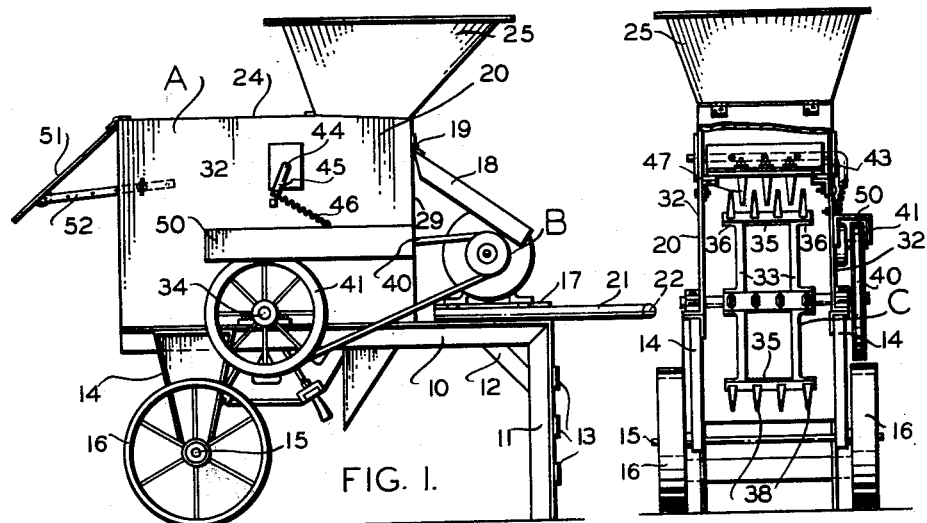
Figure 1 is a side elevation of the soil shredding and mixing or pulverizing machine, showing the operating side with the pulley wheel and belt drive from the motor.
Figure 2 is a side elevation of the opposite side to Figure 1, showing the machine with the soil deflecting plate at the end moved down into an almost closed position.
Figure 3 is an end view partly in section, looking from the line 3—3 of Figure 2.
Figure 4 is a longitudinal section in elevation of the machine, illustrating the relative position of the various operating parts.
Figure 5 is a side elevation of the skeleton operating drum which has rectangular side plate members which are held parallel to each other by the cross bars which support the tines and which is mounted on the main operating shaft.
Figure 6 illustrates a form of rubber handle sheet for the end of the handle bar, only a portion of the bar being illustrated.

The soil shredder A is formed with an L-shaped angle bar frame portion with a long angle bar 10 acting as the sill for supporting the machine A, while the short angle bar members 11 are bent to extend at right angles to the member 10 and are held by the cross brace members 12 to provide a pair of depending supports which hold the machine A stationary to the ground when it is desired for operation. A series of brace cross members 13 extend across between the short legs 11 to space the same apart and to rigidly brace the frame of the machine A.

At the opposite end to the legs 11, depending bracket members 14 are provided which support an axle 15 upon the outer ends of which are mounted caster wheels 16.

At the end of the frame where the legs 11 depend, a shelf portion 17 is provided upon which the motor B is mounted which provides the power operating means for the soil pulverizer and shredder A.

The motor B is adapted to be protected by the pivoted shield 18 which is hinged at 19 to the casing 20 which is supported on the sill 10 of the frame which extends over that end of the machine under which the caster wheels 16 depend.

The machine is portable and is adapted to be moved from place to place by means of the handle bars 21 which extend parallelly on each side of the motor B projecting out from the frame sufficiently to provide hand gripping means for the operator to engage the same. The handle bars 21 may be united in a cross bar portion 22 which forms a loop-like hand engaging means, or the handle bars 21 may be extended as a pair of parallel bars, the free ends of which are covered by a pair of rubber hand grips 23, illustrated in Figure 6. The hand grips 23 may extend out beyond the end of the handle bars 21 and thus provide protecting means projecting from the bars if it is desired.

The casing 20 is made of sheet iron and is of a rectangular formation, having a top portion 24 which closes the top of the machine. At one end a soil receiving hopper 25 is provided which extends backwardly over the motor B above the guard 18. The hopper 25 is provided with one inclined wall 26 which connects with the top portion 24, while the opposite wall 27 is inclined and adapted to extend within the casing where it connects with an angularly disposed wall portion 28 which depends downward and backward toward the vertical end wall 29 adjacent the motor B. The wall 29 extends vertically and depends between the sills 10 and from which a depending angular apron 30 extends which is inclined toward the front of the machine. Thus the angular wall 28, a portion of the vertical wall 29, and the angularly disposed apron wall 30, provide the mixing pocket 31 for the soil in the casing 20 of the machine A.

Mounted in the casing 20 between the parallel longitudinal side walls 32, is a rotatable spider drum C. The rotatable spider drum C is composed of a pair of parallelly disposed spider frames 33 which are mounted to the transversely disposed axle 34, being keyed to the same so that when the axle 34 is rotated, the drum C is also rotated. The side plates 32 are spaced apart by the cross bars 35 which fit into recesses in the peripheral edge of the plates 33. The bars 35 may be secured to the end bosses 36 formed on the side plates 33 projecting from the outer surface thereof, by means of bolts 37, which bolts also support the outer tines 38.

Each cross bar 35 carries four tines 38 which are held by suitable bolt-like nuts to the cross bar 35, so that any of the tines can be replaced at any time. The shaft 34 is adapted to be rotated by the motor B through the belt 40 and the pulley 41 which is fixed to the end of the shaft 34. The motor B is operated by any suitable switch means, not shown in the drawing, so that when it is desired to operate the machine A, the motor is turned on, causing the skeleton drum C with the tines 38 to be rotated in a clockwise direction. Radially above the shaft 34 extending between the side walls 32 of the frame 20 is provided a fixed cross bar 42 which may be of angle iron formation and which is adapted to rest on either end on the rubber cushions 43 which are supported by the side walls 32 of the casing 20. The cross bar 42 is pivotally supported on the transverse shaft 44 which is pivoted in the side walls 32 and which is bent to extend at right angles along the outside of one of the walls 32 to form an arm 45 to the free ends of which the coil spring 46 is secured to hold the cross bar 43 normally in operating position as illustrated in Figures 3 and 4.

A series of three or four depending tines 47 are removably secured to the cross bar 42 being positioned so that they extend between the tines 38 of the drum C.

By means of the spring 46 the cross bar 42 may pivot with the tines 47 should a rock or other solid obstruction come between the tines 38 and the tines 47. Thus the tines 47 are releasable so as not to injure the machine in its operation.

The operating belt 40 is protected by a projecting shield 50 which is secured to the outside of one of the side walls 32 and extends out far enough and depends down so as to protect the belt 40 from the soil in the operation of the machine A.

At the front or open end of the machine A, a hinged soil deflecting plate 51 is provided which is adapted to be adjustably held by the brace bar 52 which has a series of holes in the same, and by means of suitable wing nuts the brace bar 52 may be adjusted into the desired position to hold the plate 51 projecting at the proper angle to deflect soil from the open end of the machine in the direction desired; it being apparent that when the deflecting plate 51 is raised to a higher position away from the open end, the soil will be deflected further away from the machine, and when the plate 51 is deflected at a lesser angle from the open end of the machine A, the soil will be deflected downwardly to a point closer to the machine A.

In the operation of the machine A, the motor B is caused to rotate the drum C at the desired rate of speed and soil is introduced in the machine A in the hopper 25 while the machine is in operation. As the soil slides down the inclined wall 27, it will come in contact with the rotating drum C and the tines 38 thereof tending to carry the soil against the tines 47 of the fixed tine support 42. Some of the soil will move down into the pocket 31 where it will be rotated and mixed by the tines 38 before it is carried up past the tines 47 and out of the open end soil shredder and pulverizer A. Thus the machine A may be operated to pulverize and shred the soil, conditioning it so that it may be used in various manners, for instance, for potting and planting by florists, by landscape architects, by nurserymen, and for cemeteries, parks and private estates, as well as for many other uses where it is desirable to thoroughly condition the soil before it is put into use as set forth.

It will also be apparent that the heavier soil, as well as roots, stones and other undesirable particles, is carried away from the machine, whereas, the lighter soil will be discharged close to the machine. Thus the machine A may be used to condition the soil in various manners and to mix various kinds of soil, as well as to mix soil with fertilizer if desired, all of which may be done quickly and economically with my power operated soil conditioner.

The soil conditioner is made strong and durable, yet light in weight so that it may be portable as hereinbefore set forth, and adapted to operate in an economical manner, saving time in the handling and conditioning of soil, and therefore provides a very desirable means for the purposes set forth.

In accordance with the patent statutes, the principles and operation of my soil conditioner have been thoroughly set forth, and the drawing is adapted to represent the best embodiment thereof; however, the invention should be interpreted within the scope of the following claim and the drawing is only illustrative of a means of carrying out the principles of the invention.

I claim:

A soil pulverizer and mixer including a rectangular casing, a hopper mounted above one end of the top of said casing, an open end provided at the other end of said casing, the bottom of said casing being substantially open, a soil mixing pocket at the base of said hopper, a rotatable soil shredding drum in the lower portion of the casing alongside the mixing pocket, a series of soil engaging tines projecting outwardly from the drum, means for rotating said drum in a clockwise direction so as to move the tines upwardly through the mixing pocket, an auxiliary cross bar pivotally mounted between the side walls of said casing and positioned directly above said drum, a series of tines mounted to and projecting downwardly from said auxiliary cross bar adapted to cooperate with the tines on the rotatable drum, and spring means for normally holding said tines in a vertical downward direction but free to be rocked with the crossbar to permit solid matter to pass on the drum with pulverized soil, whereby when soil is introduced into said hopper the soil will come in contact with the top portion of said shredding drum and into the mixing pocket and the drum and cooperating sets of tines will mix and pulverize the soil in said mixing pocket and on the drum.

FRANK J. LINDIG, Jr.